Nov. 25, 1930.   A. VAN DUYN   1,782,670
INDICATING MEANS FOR WEIGHING APPARATUS
Filed Jan. 15, 1930
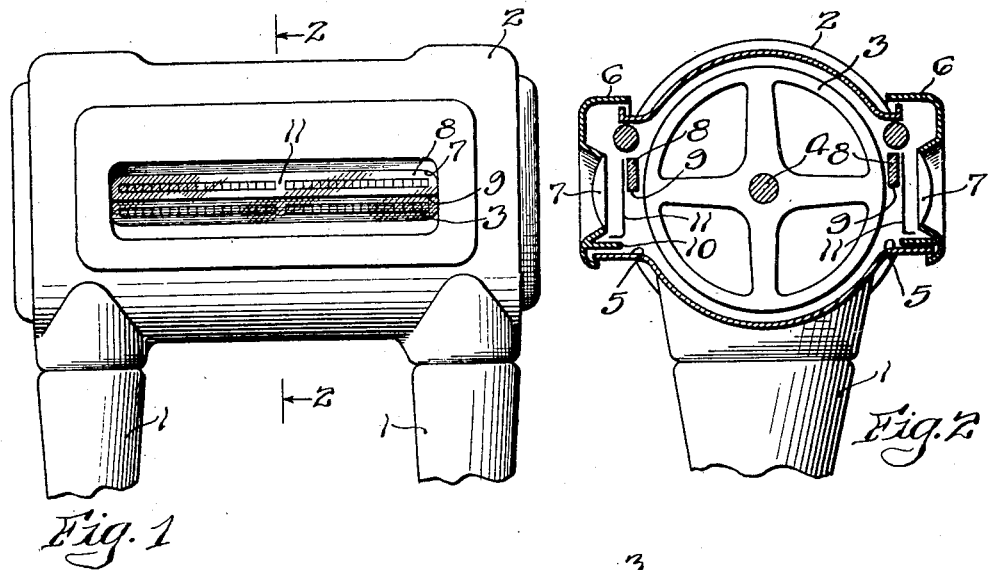
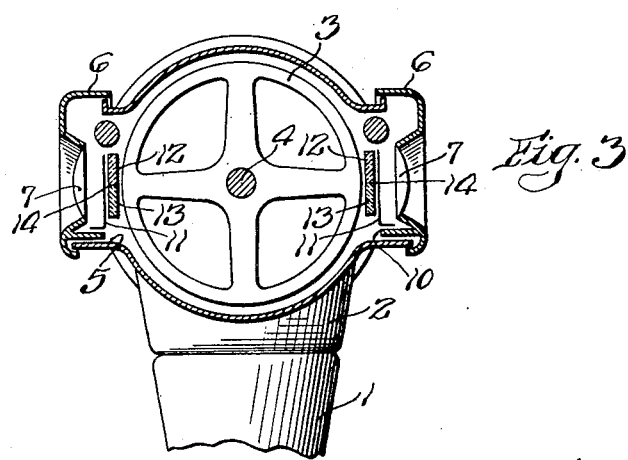
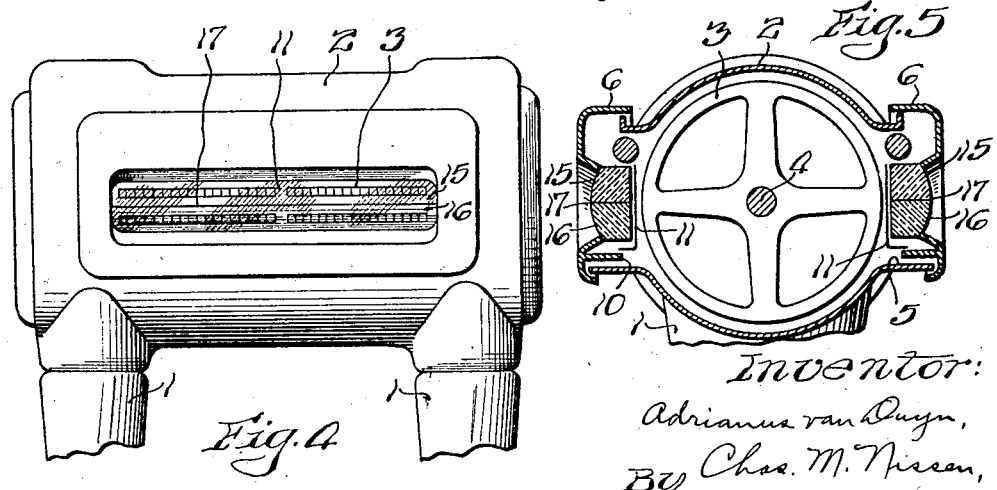
Inventor:
Adrianus van Duyn,
By Chas. M. Nissen,
Atty.

Patented Nov. 25, 1930

1,782,670

UNITED STATES PATENT OFFICE

ADRIANUS VAN DUYN, OF ROTTERDAM, NETHERLANDS, ASSIGNOR TO NAAMLOOZE VENNOOTSCHAP MAATSCHAPPIJ TOT VERAARDIGING VAN SNIJMACHINES VOLGENS VAN BERKEL'S PATENT EN VAN ANDERE WERKTINGEN, OF ROTTERDAM, NETHERLANDS, A LIMITED-LIABILITY COMPANY OF THE NETHERLANDS

INDICATING MEANS FOR WEIGHING APPARATUS

Application filed January 15, 1930, Serial No. 420,843, and in Great Britain January 19, 1929.

The present invention relates to weighing apparatus and particularly to that type of semi-automatic and automatic apparatus having a chart which indicates the weight, price, or other data concerning the article or articles being weighed. The invention is more particularly applicable to apparatus of this type in which the chart is rotatable and the reading line is stationary.

In order that the reading of the chart may be made quickly and accurately, it is essential that the reading line should be sufficiently large to be clearly visible above the chart and yet sufficiently small so as not to interfere with the accurate reading of the chart.

One object of this invention is to provide an improved datum or reading line for charts to be used in weighing apparatus of the type specified.

More particularly this invention contemplate using a piece of transparent material, one side or edge of which serves as a datum or reading line.

Another object of this invention is to provide a piece of transparent material arranged in front of a rotating drum or other moving chart so that the under side or upper side of said piece forms a horizontal face disposed in the normal line of vision, thus acting as a guide to indicate when the chart is being viewed from the proper angle. If desired, several such pieces may be provided in abutting relationship with the edges or sides of said pieces so arranged that the side or edge of one piece is in the same plane or otherwise in alinement with the side or edge of the other piece.

Another object of this invention is to provision of simplified means for indicating when the person reading the chart is standing in the proper position and viewing the chart from the proper angle when reading the same, it being obvious that if the person reading the chart is not standing in the proper position inaccurate reading of the chart will result due to parallax and other like causes.

Another object of this invention is the provision of a transparent piece of material for use as a guide for reading the indications on a chart of the weighing apparatus, the under side of said transparent material being used as a guide since by using the under side of the piece of transparent material no dirt, dust, or other foreign matter can collect thereon to impair the usefulness of the said edge as a datum or reading line.

In the drawings—

Fig. 1 is an elevational view of that portion of the weighing apparatus which encloses the chart and the means which co-operates therewith to indicate the proper readings to be taken from the chart;

Fig. 2 is a section substantially on the line 2—2 of Fig. 1;

Fig. 3 is a view similar to Fig. 2, showing a modified form of my invention; and Figs. 4 and 5 are views similar to Figs. 1 and 2, respectively, of a still further modification of my invention.

In Figs. 1 and 2, 1 represents the pillars or posts which extend up from the base of the weighing apparatus and these posts support the cylindrical casing 2 which houses the drum-shaped chart 3 rotatably mounted on the shaft 4 suitably supported within the casing in a manner well known in the art to which this invention pertains. The casing 2 has a plurality of openings 5 on opposite sides thereof so that the chart may be viewed from either side of the weighing apparatus through said openings. Each of the openings 5 is covered by a cap 6 having a transparent window 7 usually constructed so as to magnify the indications on the chart so as to make said indications easier for the operator to read.

Usually in apparatus of this type, a fixed reading line is provided, this reading line generally being constructed of a thin piece of metal arranged in close proximity to the surface of the chart. However, this piece of metal must necessarily be arranged in spaced relation from the surface of the chart so as not to interfere with the rotation thereof.

Therefore when reading the chart inaccuracies are apt to creep in due to parallax. In other words, a tall person would be apt to get an entirely different reading than a short person, due to the difference in the angle of sight from their eyes to the indicating chart. To avoid this difficulty, I propose to provide apparatus of this type with a transparent member 8 in place of the usual metal member which is not transparent and make this transparent member of substantial thickness so that the lower edge 9 thereof can be used as a plane with which the eye of the person should be alined for proper reading of the chart. Preferably the plane of the lower edge 9 if extended would pass through the center of the rotating drum 3. In use, one merely changes the position of the eye until the lower surface 9 of the transparent member 8 appears as a fine line instead of a surface. If the eye is below the surface 9 it will be readily apparent that the chart is not being viewed from the proper angle as the operator will be able to see a substantial amount of the lower edge. If the eye of the operator is above the lower edge 9, he again sees a substantial amount of the surface 9 due to the transparency of the member 8. However, if the operator's eye is in the same plane as the lower surface 9, the surface 9 will appear to be a very fine line which has substantially no width. Therefore, if a reading is taken with the eye at this position, the operator knows that the correct reading will be taken from the chart.

On the lower edges of the covers 6, I provide a ledge 10 which supports an L-shaped masking member 11, the vertical portion of which masks a considerable portion of the chart so that only that portion directly below and near the under side of the transparent member 8 is visible. This facilitates reading of the chart and reduces the number of mistakes apt to be made in reading the chart.

In Fig. 3, I have shown a modification of the device shown in Figs. 1 and 2, in which the datum or reading line is formed by a plurality of transparent members 12 and 13 arranged in abutting relationship with each other and their abutting surfaces form a datum or reading line 14 which is in a plane through the center of the horizontal axis of the rotating drum. The remaining parts of the apparatus are the same as shown in Figs. 1 and 2. The advantage of this device over that shown in Figs. 1 and 2, is that it is impossible for dust and dirt to collect on the surfaces which form the datum or reading line, although in the modification shown in Figs. 1 and 2 it is practically impossible for any dust or dirt to collect on the reading line, due to the fact that the reading line is formed by the under surface of the transparent member.

In Figs. 4 and 5, I have shown my invention applied to a weighing apparatus in which the transparent members which form the datum or reading line also form the windows of the caps 6. As shown in Fig. 5, the windows in the caps 6 are each formed of two sections of transparent material 15 and 16 arranged in abutting relationship with each other the same as the members 12 and 13 in Fig. 3. The abutting surfaces of the members 15 and 16 form a datum or reading line 17 arranged substantially in the same manner as the datum or reading line shown in Fig. 3.

One surface of each of the members 15 and 16 is formed convex so that when the two are placed together they form a window which magnifies the readings on the chart. This does away with the necessity of providing separate transparent members for the datum or reading line and for the windows. The remaining parts of the apparatus shown in Figs. 4 and 5 are substantially the same as those shown in Figs. 1, 2 and 3.

In the form of the invention shown in Figs. 4 and 5, it will be noted that a very broad reading surface is formed by the abutting surfaces of the members 15 and 16, thus making it easier for the operator to detect when the chart is not being read from the proper angle.

I wish to have it understood that the invention is not limited to weighing apparatus having a movable chart and a stationary datum or reading line, but it is also applicable to weighing apparatus of the type in which the chart is stationary and the pointer or indicator is movable.

Obviously those skilled in the art may make various changes in the details and arrangement of parts without departing from the spirit and scope of the invention as defined by the claims hereto appended, and I wish therefore not to be restricted to the precise construction herein disclosed.

Having thus fully disclosed an embodiment of my invention, what I desire to secure by Letters Patent of the United States is:

1. A weighing apparatus comprising an indicating chart and a transparent member of substantial thickness being arranged in front of said chart, one edge of said transparent member itself serving as a datum or reading line for the indications on said chart.

2. A weighing apparatus comprising a rotatable drum having indicia thereon, and a transparent member arranged substantially parallel with the axis of rotation of said drum, said transparent member having an edge thereof of appreciable thickness and being adapted to act as a guide in reading the indicia on said chart due to the difference in the refraction of light by said edge and the adjacent portions of said transparent member.

3. A weighing apparatus comprising an indicating chart, a transparent piece of material of appreciable thickness adjacent said chart, said indicating chart and piece of transparent material being movable relatively to each other, a second piece of transparent material abutting said first piece of transparent material and arranged so that the abutting surfaces co-operate to form a datum or reading line for the data on said chart.

4. A weighing apparatus comprising a chart, a casing for said chart, a transparent member in front of said chart, one edge of said member acting as a reading line for the indications on said chart, and a separate transparent member constituting part of said casing through which the chart and first mentioned transparent member are visible.

5. Weighing apparatus comprising a chart having indications thereon, a transparent member adjacent thereto, one edge of said member acting as a datum or reading line for the indications on said chart, and a mask for masking the chart so that only the indications in close proximity to said edge are visible.

6. In a weighing apparatus, a piece of transparent material, one edge of which is of substantial width and acts as a datum or reading line, the surface of said edge being unobscured.

7. In a weighing apparatus, an indicating member therefor comprising a pair of transparent abutting members of appreciable thickness having their abutting surfaces acting as a datum or reading line.

8. A weighing apparatus comprising a casing, a chart within said casing, a pair of transparent members having surfaces arranged in abutting relationship with each other throughout their entire opposed areas and arranged within an opening in said casing to constitute a window for said casing, the abutting surfaces of said members forming a reading line for the indications on said chart, said transparent members also being shaped so as to magnify the indicia on said chart.

9. A weighing apparatus comprising a chart having indicia thereon, a transparent member arranged in front of said chart, said transparent member having a flat surface at a substantial angle to the surface of said chart and to the adjacent surfaces of said transparent member so that said indicia on said chart will not be clearly visible through said flat surface from normal angles of observation, said flat surfaces being arranged to act as a guide for reading said chart, the correct reading lying in the plane of said surface.

In testimony whereof I have signed my name to this specification on this 28th day of December, A. D. 1929.

ADRIANUS van DUYN.